(12) United States Patent
Odejerte, Jr.

(10) Patent No.: US 10,959,068 B2
(45) Date of Patent: Mar. 23, 2021

(54) SYSTEM AND METHOD OF PROVISIONING A NODE NETWORK

(71) Applicant: Huf North America Automotive Parts Manufacturing Corp., Milwaukee, WI (US)

(72) Inventor: Antonio Odejerte, Jr., Farmington Hills, MI (US)

(73) Assignee: Huf North America Automotive Parts Manufacturing Corp., Milwaukee, WI (US)

( * ) Notice: Subject to any disclaimer, the term of this patent is extended or adjusted under 35 U.S.C. 154(b) by 138 days.

(21) Appl. No.: 15/885,166

(22) Filed: Jan. 31, 2018

(65) Prior Publication Data

US 2018/0227725 A1    Aug. 9, 2018

Related U.S. Application Data

(60) Provisional application No. 62/456,797, filed on Feb. 9, 2017.

(51) Int. Cl.
| | |
|---|---|
| *H04W 4/40* | (2018.01) |
| *H04L 29/08* | (2006.01) |
| *H04W 4/80* | (2018.01) |
| *H04W 64/00* | (2009.01) |
| *G01S 5/02* | (2010.01) |
| *G07C 5/00* | (2006.01) |

(52) U.S. Cl.
CPC ............. *H04W 4/40* (2018.02); *G01S 5/0252* (2013.01); *H04L 67/12* (2013.01); *H04W 4/80* (2018.02); *H04W 64/003* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 9,041,533 B1 | 5/2015 | Villa et al. | |
| 2008/0001729 A1* | 1/2008 | Kyllmann | B60C 23/009 340/445 |

(Continued)

OTHER PUBLICATIONS

European Patent Office, Extended European Search Report for EP Application No. 18155326.4, dated Apr. 17, 2018.

*Primary Examiner* — Adnan Baig
(74) *Attorney, Agent, or Firm* — Honigman LLP; Brandon C. Griffith; Jonathan P. O'Brien (57) ABSTRACT

A method of provisioning car access in a vehicle includes establishing, at data processing hardware, a secure connection between a production tool and more than one low energy communication node of the vehicle. The method also includes acquiring, at the data processing hardware, communication node information from the production tool regarding the more than one low energy node of the vehicle, the more than one low energy node having at least one main node and at least one satellite node. The method further includes communicating, from the data processing hardware, the communication node information about the at least one main node and at least one satellite node, and determining, by the data processing hardware, a mounting location of the at least one satellite node according to signal characteristic data of at least one low energy signal data packet from the at least one satellite node.

14 Claims, 7 Drawing Sheets

(56) References Cited

U.S. PATENT DOCUMENTS

2010/0152947 A1\* 6/2010 Denholm ............. G07C 5/0808
 701/29.6
2016/0147521 A1 5/2016 Hieronymi
2017/0136834 A1\* 5/2017 Chong ................ B60C 23/0479

\* cited by examiner

SYSTEM AND METHOD OF PROVISIONING A NODE NETWORK

CROSS REFERENCE TO RELATED APPLICATION

This application claims priority under 35 U.S.C. § 119(e) to U.S. Provisional Application 62/456,797, filed on Feb. 9, 2017, the disclosure of which is hereby incorporated by reference in its entirety.

TECHNICAL FIELD

This disclosure relates to vehicle access operations or more particularly to provisioning Bluetooth low energy nodes in a vehicle.

BACKGROUND

This section provides background information related to the present disclosure and is not necessarily prior art.

A wireless communication device, such as a smartphone, a smart watch, or a computer (e.g., a tablet, laptop, personal digital assistant, etc.), for example, can be used to communicate with a motor vehicle. For example, a wireless communication device can communicate with vehicle systems of the vehicle in order to access, diagnose faults, start/stop, or provide power to certain components or systems within the vehicle. In particular, a user may utilize a wireless communication protocol (e.g., short-range radio wave communication, Wi-Fi, BLUETOOTH®, BLUETOOTH® low energy (BLE), near field communication (NFC), etc.) to access or operate the vehicle. For example, the operator may access or operate the vehicle by utilizing a wireless communication protocol controlled and powered by a smartphone.

Vehicles today are generally using multiple Bluetooth low energy nodes to communicate with vehicle systems. In order for the Bluetooth low energy nodes to properly communicate with each other, an entity, such as a vehicle manufacturer, an original equipment manufacturer (OEM), or a repair operator, may need to provision each Bluetooth low energy node within the network in order to mount, to replace, to program, or to reprogram the Bluetooth low energy nodes. The provisioning process generally involves connecting the Bluetooth low energy node to the Bluetooth low energy network. The provisioning process often entails coordinating or communicating network access identifications such as security credentials, unique identifiers, or other network information between two or more Bluetooth low energy nodes.

During the provisioning process, the Bluetooth low energy system may be susceptible to security threats, which can occur when one or more unauthorized wireless communication devices communicate with the vehicle. Unauthorized wireless communication devices may intercept, or otherwise receive, one or more wireless communications between a vehicle and an authorized wireless communication device. Unauthorized wireless communication may compromise the safety of the vehicle and the vehicle system because, for example, the vehicle may allow an unauthorized wireless communication device to unlock the doors on the vehicle or to start the engine of the vehicle. With an increased number of Bluetooth low energy nodes in vehicles, a Bluetooth low energy node network has potentially greater vulnerability and greater potential provisioning complexity. While known systems and methods for provisioning Bluetooth low energy nodes have proven acceptable for their intended purpose, a continuous need for improvement in the relevant art remains.

SUMMARY

One aspect of the disclosure provides a method of provisioning car access in a vehicle. The method includes establishing, at data processing hardware, a connection between a production tool and more than one low energy communication node of the vehicle. The method also includes acquiring, at the data processing hardware, communication node information from the production tool regarding the more than one low energy communication node of the vehicle, the more than one low energy communication node having at least one main node and at least one satellite node. The method further includes communicating, from the data processing hardware, communication node information about the at least one main node and the at least one satellite node, and determining, by the data processing hardware, a mounting location of the at least one satellite node according to signal characteristic data of at least one low energy signal data packet from the at least one satellite node.

Implementations of the disclosure may include one or more of the following optional features. In some implementations, the low energy communication node is a short-range low energy radio frequency communication node. Here, the short-range low energy radio frequency communication node may be at least one of a Bluetooth low energy node or an ultra-wideband (UWB) low energy node.

In some configurations, acquiring communication node information includes updating a database with node information from each low energy communication node of the vehicle. Communicating may also include generating a secure connection between the at least one main node and the at least one satellite node. Communicating may further include commanding the at least one satellite node to advertise at least one low energy signal data packet.

In some examples, determining the mounting location includes: scanning, by the at least one main node, for at least one low energy signal data packet; filtering the at least one low energy signal data packet received by the at least one main node; and comparing the received at least one low energy signal data packet to a characteristic database. The method may also include updating at least one of the production tool or a database with the mounting location of the at least one satellite node. The method may further include mounting the at least one main node and the at least one satellite node in the vehicle.

Another aspect of the disclosure provides a method of securing car access in a vehicle. The method includes providing an identifier of at least one satellite node to a main node and generating a security session between the main node and the at least one satellite node based on the identifier. The method also includes advertising at least one low energy signal data packet from the at least one satellite node and determining, by the main node, a mounting location of the at least one satellite node from a signal strength of the at least one low energy signal data packet.

This aspect may include one or more of the following optional features. In some examples, the main node and the at least one satellite node include a short-range low energy radio frequency communication node. Here, the short-range low energy radio frequency communication node may be at least one of a Bluetooth low energy node or a ultra-wideband (UWB) low energy node.

In some configurations, the method includes mounting the main node and the at least one satellite node in the vehicle. Determining the mounting location may include: scanning, by the main node, for at least one low energy signal data packet; filtering the at least one low energy signal data packet received by the main node; and comparing a signal strength of the received at least one low energy signal data packet to a signal strength lookup table.

In some implementations, the method includes securely updating a production tool with a mounting location of the at least one satellite node. Securely updating the production tool may further include securely communicating between a production tool and a database. In some examples, determining the mounting location further includes: scanning, by the main node and more than one satellite node, for at least one low energy data packet; communicating the at least one signal data packet received by the more than one satellite node to the main node; and comparing a signal strength of the received at least one low energy data packet to a signal strength lookup table.

Yet another aspect of the disclosure provides a system. The system includes data processing hardware and memory hardware in communication with the data processing hardware. The memory storing instructions, when executed on the data processing hardware, cause the data processing hardware to perform operations. The operations include establishing a connection between a production tool and more than one low energy communication node of a vehicle and acquiring communication node information from the production tool regarding the more than one low energy communication node of the vehicle. The more than one low energy communication node has at least one main node and at least one satellite node. The operations also include communicating the communication node information about the at least one main node and at least one satellite node and determining a mounting location of the at least one satellite node according to signal characteristic data of at least one low energy signal data packet from the at least one satellite node.

Implementations of the disclosure may include one or more of the following optional features. In some implementations, the low energy communication node is a short-range low energy radio frequency communication node. Here, the short-range low energy radio frequency communication node is at least one of a Bluetooth low energy node or an ultra-wideband (UWB) low energy node.

In some examples, the operations include updating, by the processing hardware, node information from each low energy communication node of the vehicle. The operations may also include generating, by the data processing hardware, a secure connection between the at least one main node and the at least one satellite node. Additionally or alternatively, the operations may include commanding, from the data processing hardware, the at least one satellite node to advertise at least one low energy signal data packet.

In some configurations, the operations include receiving, at the data processing hardware, at least one low energy signal data packet, filtering, by the data processing hardware, the at least one low energy signal data packet, and comparing, by the data processing hardware, the received at least one low energy signal data packet to a characteristic database. The operations may also include updating, by the data processing hardware, at least one of the production tool or a database with the mounting location of the at least one satellite node. In some examples, the at least one main node and the at least one satellite node are mounted in the vehicle.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Although this disclosure describes a vehicle environment 10 with respect to Bluetooth low energy nodes 100, nodes 100 may be any type of low energy communication nodes. This means that the nodes 100 may utilize wireless communication protocols such short-range radio wave communication (i.e. short-range radio frequencies), Wi-Fi, Wi-Fi HaLow (i.e. a wireless networking protocol of IEEE 802.11ah), BLUETOOTH®, BLUETOOTH® low energy (BLE), near field communication (NFC), ultra-wideband (UWB) low energy, etc. Accordingly, while the low energy nodes 100 may be referred to herein as "Bluetooth low energy nodes 100," it will be appreciated that the low energy nodes 100 may include other types of short-range, low energy radio frequency communication nodes within the scope of the present disclosure. For example, the low energy nodes 100 may include ultra-wideband (UWB) nodes, Wi-Fi nodes, NFC nodes, or any other type of low energy radiofrequency communication node. In this regard, it will be appreciated that references herein to "Bluetooth" or Bluetooth communication protocols (e.g., Bluetooth node information, Bluetooth low energy data packets) will be understood to encompass, or otherwise refer equally to, other low energy radiofrequency communication protocols or signals, such as UWB, Wi-Fi, or NFC.

Figure 1A:
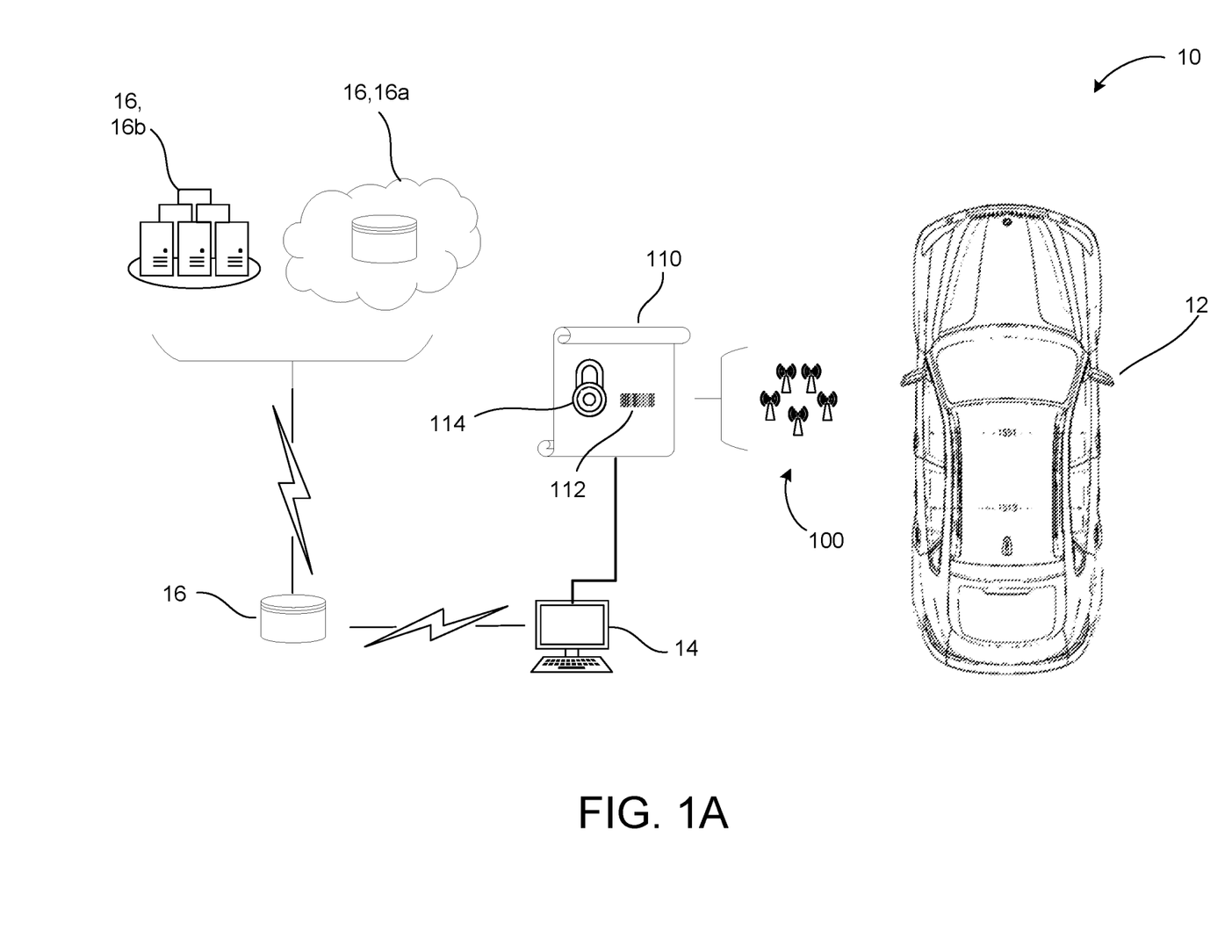
FIG. 1A is an example diagram view of a vehicle environment.

FIG. 1A is an example of a vehicle environment 10. The vehicle environment 10 is any place where an entity (e.g., vehicle manufacturer, original equipment manufacturer (OEM), repair operator, etc.) may mount, replace, program, or reprogram low energy nodes 100. For example, the vehicle environment 10 may be a manufacturing plant (e.g., a production line) or a vehicle repair center (e.g., a dealership or a local repair shop). In some examples, the vehicle environment 10 includes a vehicle 12, a production tool 14, and a database 16. In the vehicle environment 10, the vehicle 12 is either being outfit with low energy nodes 100 or has been outfit with the low energy nodes 100.

Referring further to FIG. 1A, the production tool 14 is configured to provision the Bluetooth low energy nodes 100. The production tool 14 may be a networked device such as a personal computer, a mobile device (tablet or cellular phone), or an OEM specific production tool. The production tool 14 may communicate between the database 16 and the Bluetooth low energy nodes 100 of the vehicle 12. For example, the production tool 14 is operable to scan, to read, or to input Bluetooth node information 110 from the Bluetooth low energy nodes 100. The production tool 14 may store this information internally within memory of the production tool 14 or may communicate with the database 16 to store collected Bluetooth node information 110. Communication between the production tool 14 and the database 16 enables Bluetooth node information 110 to be sent or to be received between the production tool 14 and the database 16. Bluetooth node information 110 is hardware, software, or network information related each Bluetooth low energy node 100. For example, the Bluetooth node information 110 may include a serial number 112 of at least one Bluetooth low energy node 100 or security information 114 (e.g., a unique security credential, a unique set of security credentials, or a universal unique identifier (UUID)) of at least one blue tooth low energy node 100. When the production tool 14 receives Bluetooth node information 110, the production tool 14 may update the database 16 with the Bluetooth node information 110.

In some implementations, the production tool 14 establishes a secure connection with the database 16. With a secure connection to the database 16, the production tool 14 may send and receive Bluetooth node information 110 to the database 16. The secure connection between the production tool 14 and the database 16 prevents potential interruptions in the communication as well as potential theft of Bluetooth node information 110.

FIG. 1A includes an example of the database 16. Database 16 is configured to store at least the Bluetooth low energy node information 110 and information about the vehicle 12. Database 16 may be physically connected or wirelessly connected to the production tool 14. In some examples, the database 16 may be considered part of the production tool 14. Additionally or alternatively, the database 16 may be online or offline and local or remote. The database 16 is considered online if the database 16 may be able to connect or communicate with additional databases 16, 16a or servers 16, 16b, such as a backend or a remote database shared with an OEM. An example of the database 16 being offline is if the database 16 is disconnected from additional databases 16, 16a or servers 16, 16b (e.g., a local database that is a copy or mirror of a backend or OEM database). In some implementations, Bluetooth node suppliers may share Bluetooth node information 110 via a backend database 16, 16a or a remote server 16, 16b to the entity that mounts, replaces, programs, or reprograms the Bluetooth low energy nodes 100. Upon connection with the production tool 14, the database 16 is configured to provide the production tool 14 with the security information 114 for at least one Bluetooth low energy node 100.

In some examples when the Bluetooth low energy nodes 100 are initially mounted in the vehicle 12 (FIG. 1B), the production tool 14 scans each Bluetooth low energy node 100 and communicates to the database 16 Bluetooth node information 110 about each Bluetooth low energy node 100 that will be installed in the vehicle 12. The communication between the production tool 14 and the database 16 at least correlates the vehicle 12 (e.g., by vehicle identification number) to the serial number 112 of each Bluetooth low energy node 100 to be installed in the vehicle 12. In some implementations, the production tool 14 receives security information 114 from the database 16 about each Bluetooth low energy node 100 of the vehicle 12.

Figure 1B:
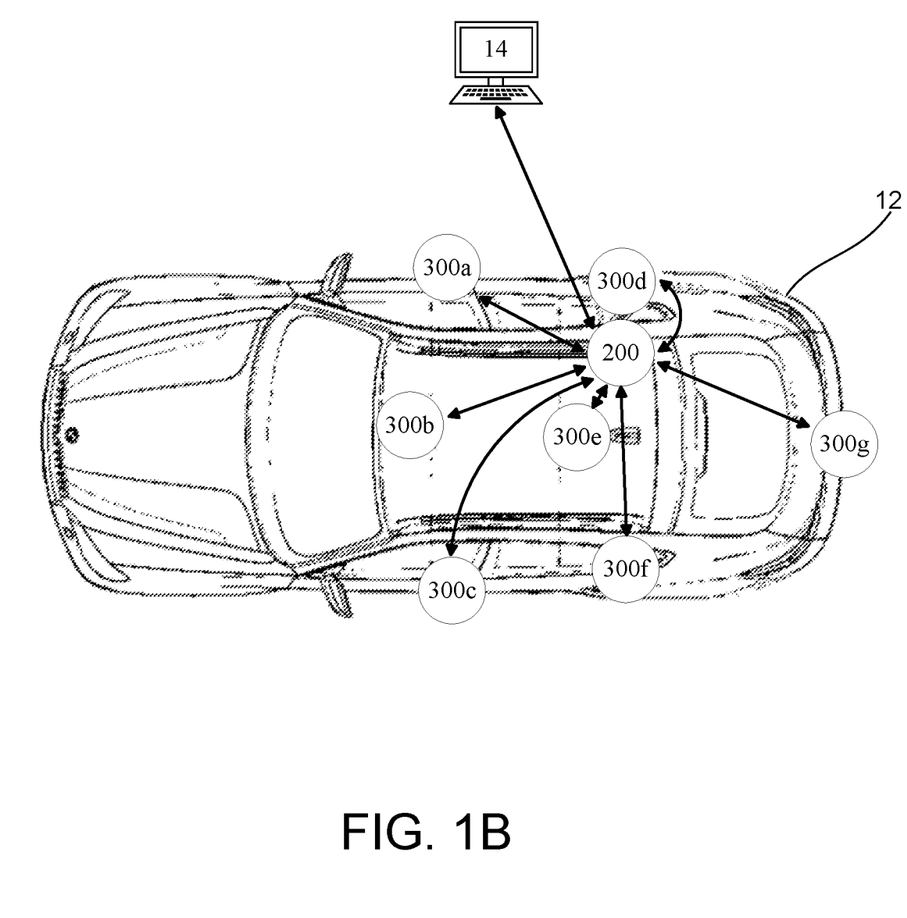
FIG. 1B is an example diagram view of a vehicle communication node system.

Referring to FIG. 1B, the vehicle 12 includes a plurality of Bluetooth low energy nodes 100. The plurality of Bluetooth energy nodes 100 is more than one Bluetooth low energy node that includes at least one main node 200 and at least one satellite node 300. Each Bluetooth low energy node 100 may be operable to be a receiver, a transmitter, or a transceiver. The at least one main node 200 is configured to communicate with the production tool 14.

In some examples, the security information 114 received by the production tool 14 from the database 16 enables the production tool 14 to have a secure connection or a security session with the at least one main node 200. Additionally or alternatively, the security information 114 received by the production tool 14 from the database 16 enables the at least one main node 200 to communicate with the at least one satellite node 300. For example, the production tool 14 provides the at least one main node 200 security information 114 corresponding to each satellite node 300 of the at least one satellite node 300. The at least one main node 200 and the at least one satellite node 300 may exchange or generate secure communication via a security key or a session key. The at least one main node 200 and the at least one satellite node 300 may store the security key or the session key and the means to authenticate communication between the at least one main node 200 and the at least one satellite node 300.

The at least one satellite node 300 may include n number of satellite nodes 300, 300n. Each satellite node 300, 300i-n is mounted in the vehicle 12 at a mounting location 320. FIG. 1B is an example of a single main node 200 connected to five satellite nodes 300, 300 a-e. The main node 200 is connected to each satellite node 300, 300 a-e via a wired communication bus (e.g., CAN bus, LIN bus, K-line bus, proprietary OEM bus, etc.). The wired communication bus may also permit a secure or unsecure connection between the at least one main node 200 and at least one satellite node 300. Referring to FIG. 1B, the vehicle 12 includes seven satellite nodes 300, 300 a-e. The satellite nodes 300 may be mounted in various locations on the vehicle 12. For example, the vehicle 12 includes satellite nodes 300, 300i-n mounted at the following locations: a passenger front door 300a; above the interior center counsel 300b; a driver-side front door 300c; a passenger rear door 300d; near an interior rear counsel 300e; a driver-side rear door 300f, and a rear tailgate 300g.

Figure 1C:
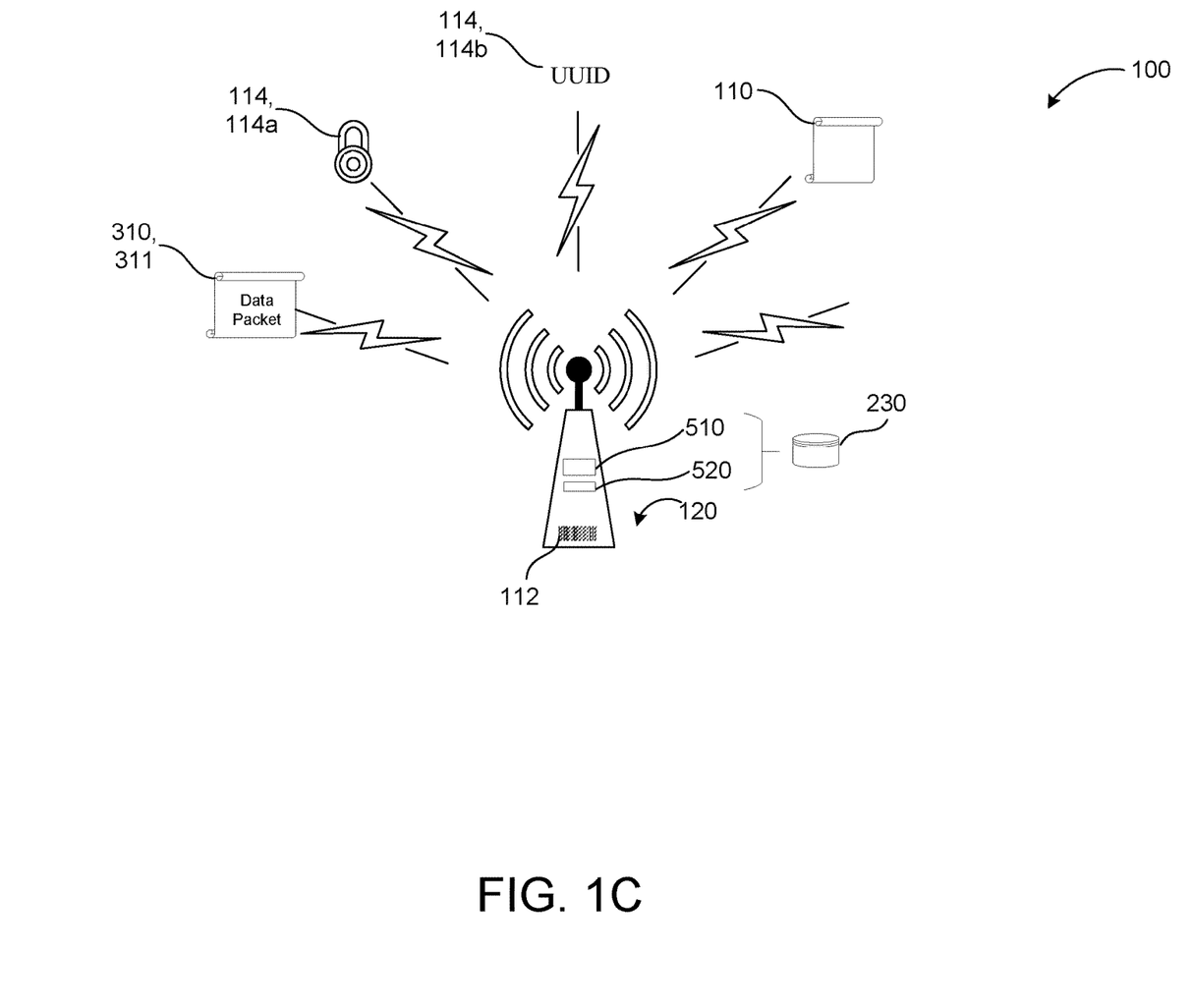
FIG. 1C is an example diagram view of a low energy communication node.

FIG. 1C is an example of the Bluetooth low energy node 100. Each Bluetooth low energy node 100 may include at least a serial number 112 (e.g., bar code or OEM part number) and a mounting location 120. The mounting location 120 of each Bluetooth low energy node 100 is a physical position where the Bluetooth low energy node 100 is actually placed within the vehicle 12. Each Bluetooth low energy node 100 may be configured to communicate with other Bluetooth low energy nodes 100 via a wired connection or a wireless connection. When the Bluetooth low energy node 100 communicates via the wireless connection, the Bluetooth low energy node 100 may broadcast or transmit Bluetooth node information 110. The Bluetooth node information 110 may include security information 114, 114a-b, such as, for example, the unique security credentials 114a or the universal unique identifier (UUID) 114b. In some examples, the Bluetooth low energy node 100 is configured to advertise Bluetooth low energy signal data packets 310 with signal characteristic data 311. The Bluetooth low energy node may include a processor 510 and memory 520 as data processing hardware. In some implementations, the data processing hardware includes a signal characteristic database 230. For example, the at least one main node 200 of the Bluetooth low energy nodes 100 may include the signal characteristic databased 230.

Figure 2:
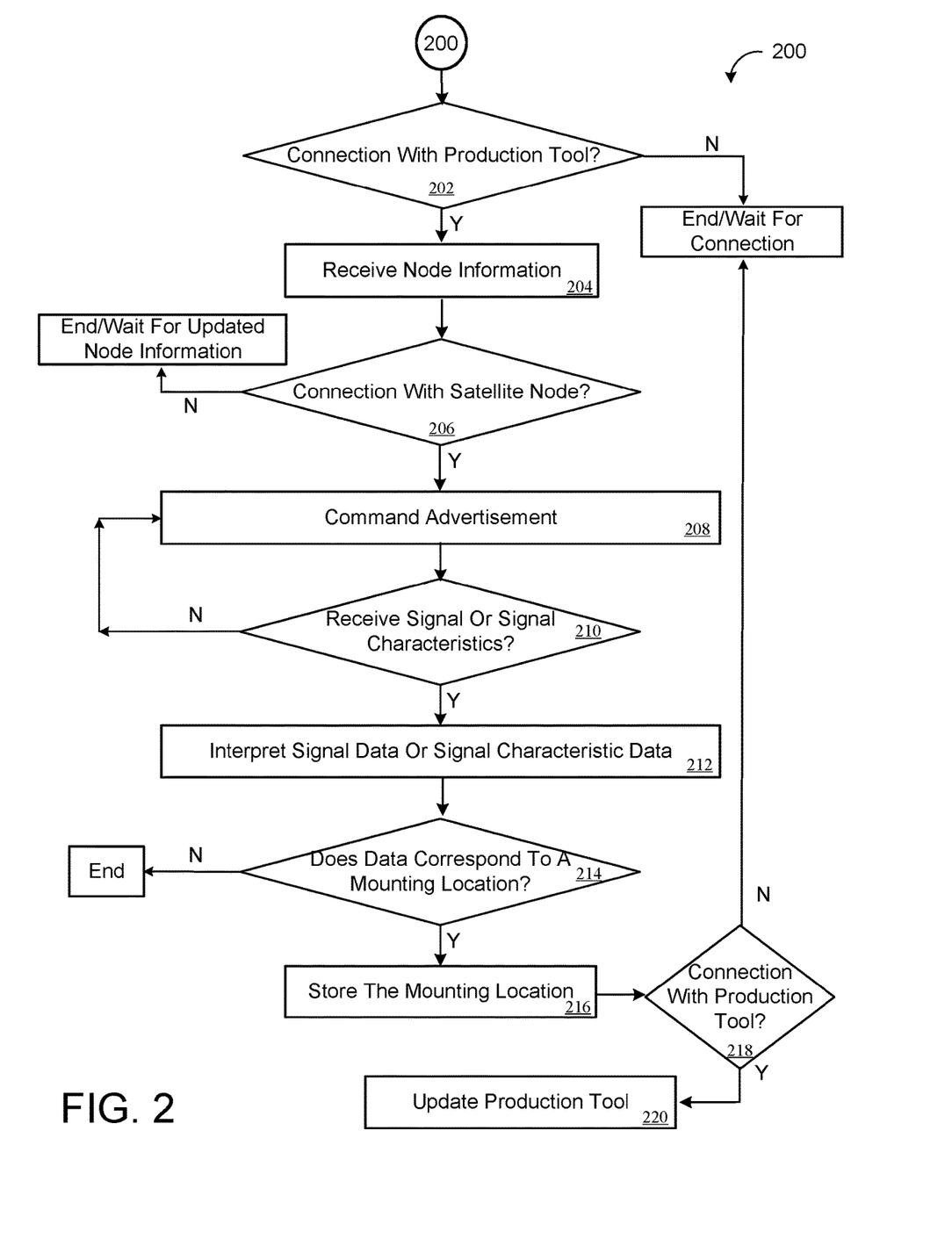
FIG. 2 is a flowchart of an example method of a main node.

FIG. 2 is an example of interactions the at least one main node 200 performs to communicate between the production tool 14 and the at least one satellite node 300. The at least one main node 200 is configured to receive Bluetooth node information 110 regarding each satellite node 300 of the plurality of Bluetooth low energy node 100 from the production tool 14. After the at least one main node 200 has established a connection with the production tool 14, the production tool 14 may send Bluetooth node information 110 regarding each satellite node 300 to the at least one main node 200. With the Bluetooth node information 110 of each satellite node 300, the at least one main node 200 may establish a connection with each satellite node 300. If the at least one main node 200 and each satellite node 300 are connected, the at least one main node 200 may command each satellite node 300 to advertise.

In some examples, the connection is a secure connection utilizing the security information 114 between the at least one main node 200 and each satellite node 300. With the secure connection, the at least one main node 200 and each satellite node 300 generates an exchange of security keys that may be used to secure and to authenticate communication between the at least one main node 200 and each satellite node 300.

Referring further to FIG. 2, the at least one main node 200 is configured to receive or to interpret signal characteristic data 311 of the Bluetooth low energy signal data packets 310 advertised by each satellite node 300. For example, the at least one main node 200 may receive or interpret measurements related to strength of the Bluetooth low energy signal data packet 310 (e.g., RSSI data) as signal characteristic data 311. If the at least one main node 200 receives or interprets the Bluetooth low energy signal data packets 310, the at least one main node 200 may filter the Bluetooth low energy signal data packets 310 according to the signal characteristic data 311 (e.g., signal strength).

In some examples, the at least one main node 200 may be preprogrammed with the signal characteristic database 230. The signal characteristic database 230 includes signal characteristic data 311 with a corresponding reference location regarding a Bluetooth low energy signal source. For example, the signal characteristic database 230 is a signal strength lookup table containing RSSI values along with the corresponding reference location of the Bluetooth low energy signal source that may generate the RSSI values. With the signal characteristic database 230, the at least one main node 200 compares signal characteristic data 311 to the signal characteristic database 230 to determine a mounting location 320 corresponding to each satellite node 300 advertising the Bluetooth low energy signal data packets 310. Additionally or alternatively, in other examples, the signal characteristic database 230 is contained within the production tool 14 or the database 16, such that the at least one main node 200 communicates with the production tool 14 or the database 16 to access the signal characteristic database 230.

Referring further to FIG. 2, the at least one main node 200 stores the mounting location 320 corresponding to the at least one satellite node 300. The at least one main node 200 is configured to communicate the mounting location 320 of the at least one satellite node 300 to the production tool 14. In some examples, to communicate the mounting location 320 to the production tool 14, the at least one main node 200 establishes a secure connection with the production tool 14. The production tool 14 may store the mounting location 320 of the at least one satellite node 300 in either the production tool 14 or the database 16. If the production tool 14 or the database 16 already has the mounting location 320 of the at least one satellite node 300 stored to memory, the production tool 14 or the database 16 may update the mounting location 320 according to the mounting location 320 received by the at least one main node 200.

Additionally or alternatively, the production tool 14 may provide compliance feedback regarding the mounting location 320 of the at least one satellite node 300. For example, the production tool 14 or the database 16 may contain a predefined mounting location 321 where the entity intends to mount the at least one satellite node 300. The production tool 14 or the database 16 may compare the mounting location 320 of the at least one satellite node 300 provided by the at least one main node 200 to the predefined mounting location 321. If the mounting location 320 and the predefined mounting location 321 are different, either the database 16 or the production tool 14 may alert the entity. As an example, a manufacturer of the vehicle 12 may have a vehicle model that is designed to have a particular number of satellite nodes 300 at predefined mounting locations 321. The manufacturer may then receive an alert if the mounting location 320 of the satellite nodes 300, as interpreted by the at least one main node 200, is the same as the predefined mounting locations 321 or different from the predefined mounting locations 321.

Figure 3:
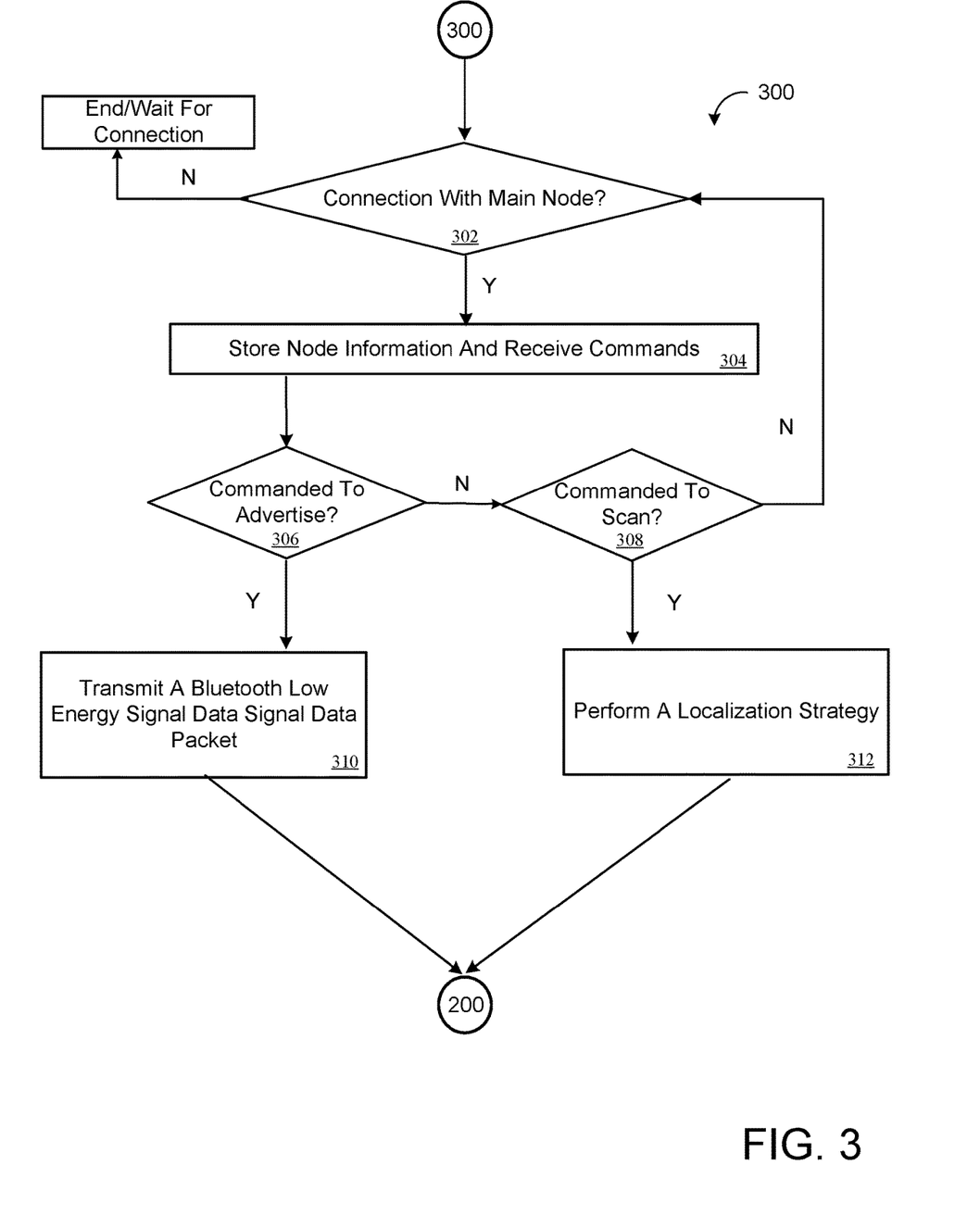
FIG. 3 is a flowchart of an example method of a satellite node.

FIG. 3 is an example of interactions of the at least one satellite node 300. Once the satellite node 300 receives power, the satellite node 300 waits for the connection to the at least one main node 200. If the connection is established between the at least one main node 200 and the at least one satellite node 300, the at least one satellite node 300 stores Bluetooth node information 110. In some examples, the Bluetooth node information 110 stored by the at least one satellite node 300 is security information 114 to secure and to authenticate communication between the at least one main node 200 and each satellite node 300. With the connection to the at least one main 200, the at least one satellite node 300 waits for commands from the at least one main node 200. If the at least one satellite 300 receives commands from the at least one main node 200, the at least one satellite 300 may be commanded to advertise or commanded to scan. When the at least one satellite node 300 is commanded to advertise, the at least one main node 200 broadcasts the Bluetooth low energy signal data packet 310. Contents of the Bluetooth low energy signal data packet 310 may vary depending on original equipment manufacturer or programmer of the Bluetooth low energy nodes 100. If the at least one satellite node 300 is commanded to scan, the at least one satellite node 300 performs a localization strategy. The localization strategy permits the at least one satellite node 300 to scan for and to receive signal characteristic data 311 from another satellite node 300 commanded to advertise. When the at least one satellite node 300 commanded to scan receives signal characteristic data 311, the at least one satellite node 300 commanded to scan transmits the signal characteristic data 311 to the at least one main node 200 connected to the at least one satellite node 300 commanded to scan.

Figure 4A:
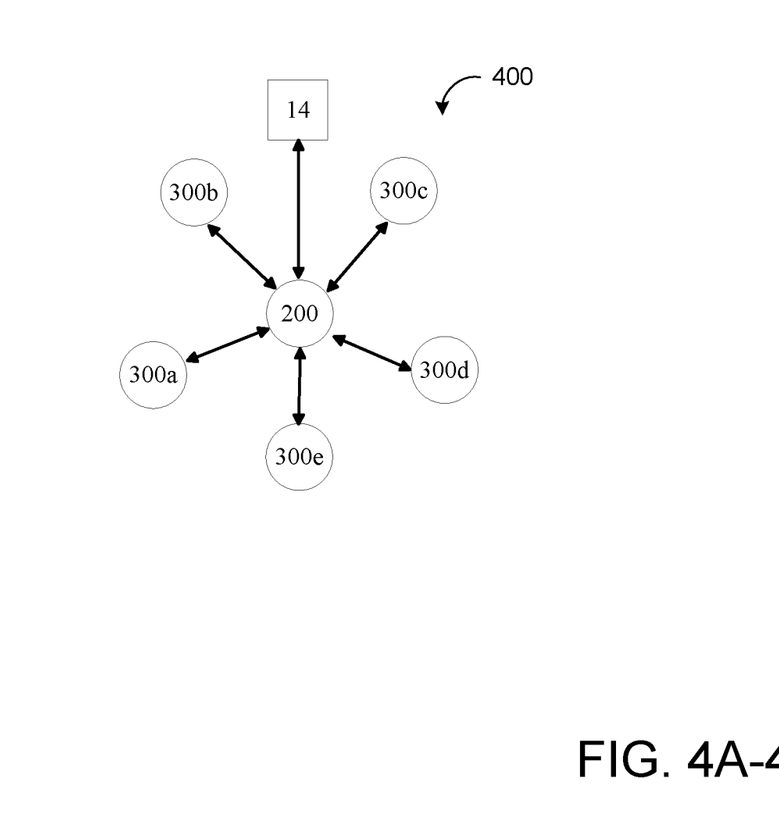
FIG. 4A-4B are example diagrams of low energy communication node networks.

FIG. 4A is an example of a node network 400 where the at least one main node 200 acts as a master node. As a master node, the at least one main node 200 is the only node of the plurality of Bluetooth low energy nodes 100 that communicates with the production tool 14. When the at least one main node 200 acts as the master node, each satellite node 300 of the at least one satellite node 300 is configured to solely communicate with the at least one main node 200. As each satellite node 300 communicates solely with the at least one main node 200, the at least one main node 200 may relay any Bluetooth node information 110 from each satellite node 300 to the production tool 14. Because multiple satellite nodes 300 connect to the single point, the at least one main node 200, this scenario is sometimes referred to as a multipoint to point connection, control node formation, or central node formation. In FIG. 4A, the control node formation with the at least one main node 200 acting as a master node includes five satellite nodes 300, 300a-e. When each satellite node 300 communicates solely with the at least one main node 200, each satellite node 300 may be referred to as a slave node or as a passive node.

Figure 4B:
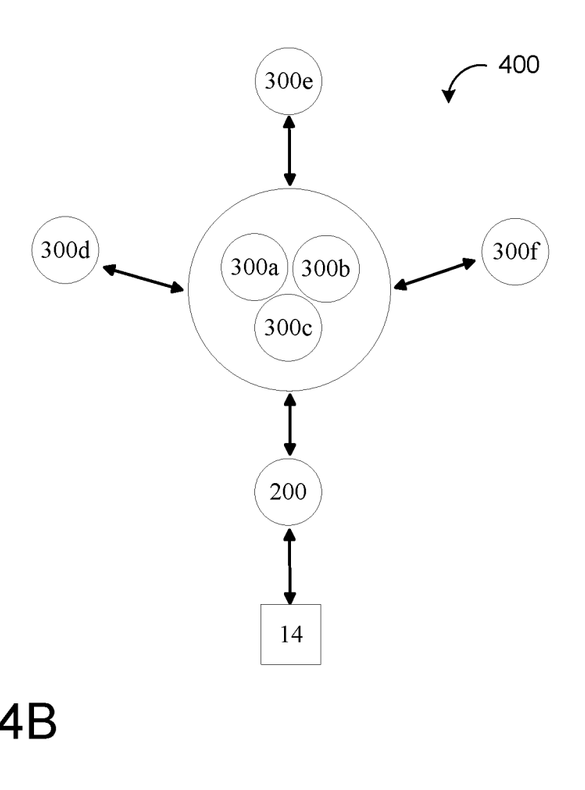

FIG. 4B is an example of a node network 400 where at least three satellite nodes 300, 300a-c are multifunctional such that the at least three satellite node 300, 300a-c may advertise the Bluetooth low energy signal data packets 310 or may scan to receive signal characteristic data 311 from at least one satellite node 300 that is advertising the Bluetooth low energy signal data packets 310. The at least three satellite nodes 300, 300a-c may scan and may receive signal characteristic data 311 from other satellite nodes 300, such as satellite node 300, 300d-f. The at least three satellite nodes 300, 300a-c communicate received signal characteristic data 311 to the at least one main node 200. With the signal characteristic data 311, the at least one main node 200 determines the mounting locations 320 of the satellite nodes 300. The at least one main node 200 is the only node of the plurality of Bluetooth low energy nodes 100 in the node network 400 that communicates with the production tool 14.

Although the interactions of the production tool 14, database 16, at least one main node 200, and the at least one satellite node 300 are described predominantly with reference to installing or to mounting Bluetooth low energy nodes 100, the systems and methods described herein are also applicable to replacing, programming, or reprogramming Bluetooth low energy nodes 100 and any point during the lifetime of the Bluetooth low energy nodes 100. For example, if the satellite node 300 that corresponds to vehicle access towards a rear of the vehicle 12 (e.g., 300g of FIG. 1B) malfunctions, a vehicle dealership or a repair center may replace the malfunctioning satellite node 300 with a replacement satellite node 300 according to the systems and methods described herein.

Figure 5:
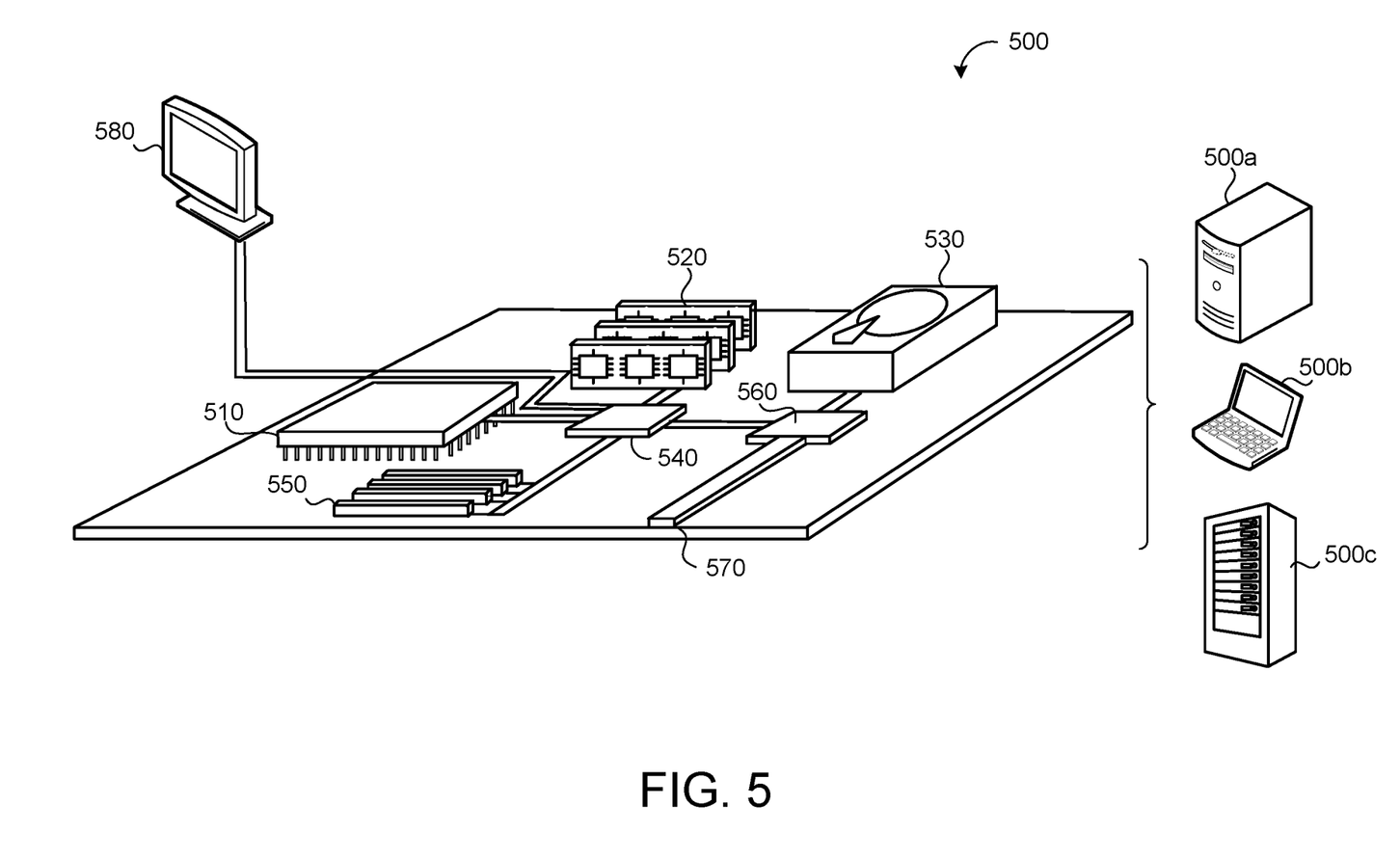
FIG. 5 is a schematic view of an example computing device used to implement the systems and the methods of low energy communication node networks.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of provisioning car access in a vehicle, the method comprising:
    establishing, at data processing hardware of a Bluetooth low energy (BLE) main node within a vehicle, a connection between a production tool and the BLE main node, the production tool corresponding to a device external to the vehicle communicating with the data processing hardware of the BLE main node within the vehicle;
    acquiring, at the data processing hardware of the BLE main node, communication node information from the production tool regarding a Bluetooth low energy (BLE) satellite node of the vehicle, the communication node information comprising security information to establish a connection between the data processing hardware and the BLE satellite node of the vehicle;
    communicating, from the data processing hardware of the BLE main node to the BLE satellite node, the communication node information acquired from the production tool;
    establishing, between the BLE main node and the BLE satellite node, a secure connection using the communicated communication node information acquired from the production tool;
    determining, by the data processing hardware of the BLE main node, a mounting location of the BLE satellite node according to a signal strength of at least one low energy signal data packet from the BLE satellite node; and
    communicating, from the data processing hardware of the BLE main node, the mounting location of the BLE satellite node to the production tool.

2. The method of claim 1, wherein acquiring communication node information further comprises updating a database with node information from each BLE satellite node of the vehicle.

3. The method of claim 1, further comprising commanding the BLE satellite node to advertise at least one low energy signal data packet.

4. The method of claim 1, wherein determining the mounting location further includes:
    receiving, by the BLE main node, at least one low energy signal data packet from the BLE satellite node;
    filtering the at least one low energy signal data packet received by the BLE main node; and
    comparing the received at least one low energy signal data packet to a characteristic database.

5. The method of claim 1, further comprising updating at least one of the production tool or a database with the mounting location of the BLE satellite node.

6. The method of claim 1, further comprising mounting (i) the BLE main node in the vehicle and (ii) the BLE satellite node in the vehicle.

7. A Bluetooth low energy (BLE) main node of a vehicle, the BLE main node comprising:
- data processing hardware; and
- memory hardware in communication with the data processing hardware, the memory hardware storing instructions that when executed on the data processing hardware cause the data processing hardware to perform operations comprising:
  - establishing a connection between a production tool and the BLE main node of the vehicle, the production tool corresponding to a device external to the vehicle communicating with the data processing hardware of the BLE main node within the vehicle;
  - acquiring communication node information from the production tool regarding a BLE satellite node of the vehicle, the communication node information comprising security information to establish a connection between the data processing hardware and the BLE satellite node of the vehicle;
  - communicating, to the BLE satellite node, the communication node information acquired from the production tool;
  - establishing, with the BLE satellite node, a secure connection using the communicated communication node information acquired from the production tool;
  - determining a mounting location of the BLE satellite node according to a signal strength of at least one low energy signal data packet from the BLE satellite node; and
  - communicating, to the production tool, the mounting location of the BLE satellite node.

8. The BLE main node of claim 7, wherein the operations further comprise updating, by the data processing hardware, node information from each BLE satellite node of the vehicle.

9. The BLE main node of claim 7, wherein the operations further comprise commanding the BLE satellite node to advertise at least one low energy signal data packet.

10. The BLE main node of claim 7, wherein the operations further comprise:
- receiving, at the data processing hardware, at least one low energy signal data packet;
- filtering, by the data processing hardware, the at least one low energy signal data packet; and
- comparing, by the data processing hardware, the received at least one low energy signal data packet to a characteristic database.

11. The BLE main node of claim 7, wherein the operations further comprise updating, by the data processing hardware, at least one of the production tool or a database with the mounting location of the BLE satellite node.

12. The BLE main node of claim 7, wherein (i) at least one main node of the more than one low energy communication node is mounted in the vehicle and (ii) the BLE satellite node is mounted in the vehicle.

13. The method of claim 1, wherein the BLE main node comprises a master node configured to communicate with the production tool on behalf of the BLE satellite node.

14. The BLE main node of claim 7, further comprising a master node configured to communicate with the production tool on behalf of the BLE satellite node.

* * * * *